(12) United States Patent
Pittman

(10) Patent No.: US 8,468,624 B2
(45) Date of Patent: Jun. 25, 2013

(54) MULTI-PURPOSE AIR MATTRESS

(76) Inventor: James J. Pittman, La Mirada, CA (US)

( * ) Notice: Subject to any disclaimer, the term of this patent is extended or adjusted under 35 U.S.C. 154(b) by 0 days.

(21) Appl. No.: 13/541,609

(22) Filed: Jul. 3, 2012

(65) Prior Publication Data

US 2012/0272450 A1 Nov. 1, 2012

Related U.S. Application Data

(63) Continuation of application No. 12/482,346, filed on Jun. 10, 2009, now Pat. No. 8,234,728.

(51) Int. Cl.
*A47C 17/80* (2006.01)

(52) U.S. Cl.
USPC .................................. 5/118; 5/119; 5/706

(58) Field of Classification Search
USPC ............... 5/421, 706, 708, 118; 296/39.2, 296/39.3
See application file for complete search history.

(56) References Cited

U.S. PATENT DOCUMENTS

| | | | |
|---|---|---|---|
| 3,600,725 A | 8/1971 | McCartney | |
| 3,736,604 A | 6/1973 | Carson, Jr. | |
| 4,091,149 A * | 5/1978 | Oxendine | 428/33 |
| 4,388,738 A | 6/1983 | Wagner | |
| D281,379 S * | 11/1985 | Isham et al. | D6/382 |
| 5,027,454 A | 7/1991 | Peng | |
| D392,145 S | 3/1998 | Thurston | |
| 5,966,755 A * | 10/1999 | Pittman | 5/118 |
| 6,163,907 A | 12/2000 | Larson | |
| 6,171,333 B1 | 1/2001 | Nelson et al. | |
| 6,763,540 B1 * | 7/2004 | Wang | 5/710 |
| 6,793,469 B2 * | 9/2004 | Chung | 417/411 |
| 7,021,694 B1 * | 4/2006 | Roberts et al. | 296/100.18 |
| 8,065,761 B2 | 11/2011 | Hanrahan | |
| 8,136,182 B2 * | 3/2012 | Ellis | 5/118 |
| 2002/0083528 A1 | 7/2002 | Fisher et al. | |
| 2005/0120477 A1 * | 6/2005 | Kennan | 5/118 |
| 2006/0064817 A1 * | 3/2006 | Heimowitz | 5/118 |
| 2006/0174416 A1 * | 8/2006 | Wu | 5/710 |
| 2007/0169273 A1 * | 7/2007 | Wu | 5/710 |
| 2008/0209643 A1 | 9/2008 | Lin et al. | |
| 2011/0225739 A1 | 9/2011 | Hanrahan | |

\* cited by examiner

*Primary Examiner* — William Kelleher
(74) *Attorney, Agent, or Firm* — Mind Law Firm, P.C.; Jeromye V. Sartain; Justin G. Sanders

(57) ABSTRACT

A multi-purpose air mattress apparatus is disclosed for use in at least a bed of a vehicle having an opposing pair of inwardly protruding wheel wells. The apparatus comprises, in one embodiment, an inflatable air mattress having a pair of opposing sidewalls, each defining a lateral recess sized for accepting at least a portion of the wheel wells therewithin and further defining recess ledges that selectively sit atop the wheel wells. With the apparatus positioned within the vehicle bed and the wheel wells positioned at least partially within the lateral recesses, the recess ledges in combination with a perimeter ledge cover substantially any exposed portions of the wheel wells, while a set of upper and lower perimeter chambers further maintain a stable structure of the apparatus during use both within a vehicle bed as well as on any other relatively flat surface in otherwise conventional fashion.

24 Claims, 10 Drawing Sheets

MULTI-PURPOSE AIR MATTRESS

RELATED APPLICATIONS

This is a continuation application of a prior filed and currently pending application having Ser. No. 12/482,346 and filing date of Jun. 10, 2009, which is itself a continuation-in-part application of a prior filed and now abandoned application having Ser. No. 11/280,395 and filing date of Nov. 17, 2005.

This application claims priority and is entitled to the filing date of U.S. Non-provisional application Ser. No. 11/280,395 filed Nov. 17, 2005, and entitled "Heated Air Mattress" and of U.S. Non-provisional application Ser. No. 12/482,346 filed Jun. 10, 2009, and entitled "Multi-Purpose Air Mattress." The contents of the aforementioned applications are incorporated by reference herein.

INCORPORATION BY REFERENCE

Applicant hereby incorporates herein by reference any and all U.S. patents and U.S. patent applications cited or referred to in this application.

BACKGROUND OF THE INVENTION

1. Field of the Invention

The present invention relates generally to air mattresses, and more particularly to an air mattress configured for use with vehicles such as a pickup truck or sport utility vehicle (SUV) or for home or other use on a relatively flat surface in otherwise conventional fashion.

2. Description of Related Art

Many vehicles, such as pickup trucks, include flatbeds, which are open containers formed within the structure of the vehicle for carrying cargo. Flatbeds often contain cumbersome protruding wheel well compartments, which reduce the volume available for cargo within the flatbed. Often, drivers who spend a great deal of time on the road, or who use their vehicles for camping and other outdoor-living or recreational activities, attempt to sleep in the flatbeds of their vehicles. The intrusive wheel well compartments can make this difficult, even when a conventional mattress is provided for reception within the flatbed. Thus, it is desirable to provide a mattress specifically shaped and designed for the vehicle flatbed, allowing the user to comfortably use the mattress, despite the presence of the uncomfortable and intrusive wheel well compartments. It is further desirable to still be able to utilize the air mattress on any other relatively flat surface in otherwise conventional fashion.

The following art defines the present state of this field:

U.S. Patent Application Publication No. 2005/0120477 to Kennan is directed to a mattress having an overall size and shape that enables it to fit securely in the back of a pick-up truck, SUV, mini-SUV or some other vehicle. While the specifications and examples listed herein assume a full-size vehicle, a proportionally smaller mattress can be configured to accommodate mid-size or smaller vehicles.

U.S. Patent Application Publication No. 2002/0083528 to Fisher et al. is directed to an inflatable mattress comprising a flexible bottom layer, a top layer sealed to the bottom layer through a wall, wherein the bottom and top layers and the wall define an outer frame of the inflatable mattress, and a middle layer disposed between the top and bottom layers. The bottom surface of the middle layer is sealed to the bottom layer through a plurality of laterally disposed I-beam structures to form a lower chamber. The top surface is attached to the top layer through a plurality of X-beam structures to form an upper chamber. A peripheral edge of the middle layer may be sealed with the wall to prevent the upper and lower chambers from being in fluid communication with each other. Alternatively, the peripheral edge may be detached from the wall so that the upper and lower chambers are in fluid communication with each other.

U.S. Pat. No. 3,600,725 to McCartney is directed to a low-pressure pneumatic cell for automobile rear seats which has a well portion and a seat portion with a padded panel covering the seat portion.

U.S. Pat. No. 4,388,738 to Wagner is directed to a mattress cover which includes a facing panel and a heat panel overlying at least a portion of the facing panel. The heat panel has an upper section, a backing section, and means for generating heat, the heat generating means being disposed between the upper and backing sections. Also provided is means for fastening the facing panel to the heat panel comprising at least one complementary pair of interlocking members comprising a first and a second locking member, the first locking member being secured to the facing panel, the second locking member being secured to the heat panel, and the first and second locking members being adjustable between an interlocked position, bridging the facing and heat panels, to an open position. The mattress cover is also provided with means for securing the facing panel to a mattress core. Also provided is a mattress construction having a mattress core and a facing panel and having said mattress cover secured to the facing panel.

U.S. Design patent No. D281,379 to Isham et al. is directed to an ornamental design for a sofa bed for a van conversion.

U.S. Design patent No. D392,145 to Thurston is directed to an ornamental design for an air mattress for pregnant women.

Applicant's prior patent, U.S. Pat. No. 5,966,755, is directed to a custom fit, inflatable air mattress, having a unitary, or one piece structure, that can be used in a variety situations such as in the flatbed of a pickup truck, station wagon, van or the like, and is designed to accurately and snugly conform around the protruding wheel well compartments.

U.S. Pat. No. 6,163,907 to Larson is directed to a mattress top assembly for a mattress comprising a pad filled with cushioning material and a plurality of connector straps attached along the head, foot, and side edges of the pad and removably connected to the sidewall of the mattress. The mattress includes one part of a cooperable fastener generally midway between top and bottom surfaces, on the sidewalls of the mattress, for detachable connection of each of the straps thereto.

U.S. Pat. No. 6,171,333 to Nelson et al. is directed to a heating and cooling comforter for heating or cooling a user. The heating and cooling comforter includes an inner bladder comprising a pair of panels coupled together along the outer perimeter of the inner bladder to define an air space therebetween. Each of the panels of the inner bladder has a plurality of spaced apart air apertures therethrough into the air space of the inner bladder. A comforter cover is also included comprising a pair of panels coupled together along the outer perimeter of the comforter cover. The comforter cover has an elongate slit therein between the panels of the comforter cover. The inner bladder is inserted into the comforter cover. A vent cover is included having an arcuate upper wall and an open bottom. An elongate conduit is extended between the from the inner bladder and the vent cover to fluidly connect the air space of the inner bladder to the vent cover.

U.S. Pat. No. 6,793,469 to Chung is directed to an inflatable product comprising an inflatable body, a socket, an electric pump, at least one battery and a connector. The socket is built in the inflatable body. The electric pump is connected to the socket to pump the inflatable body. The battery is disposed in the electric pump. The connector is provided on the electric pump for connecting an external power. The electric pump is supplied with power by the battery or the external power.

U.S. Pat. No. 7,021,694 to Roberts et al. is directed to a tent assembly comprising an awning including a plurality of tubular support members having rectilinear longitudinal lengths and a plurality of couplings for interchangeably conjoining the tubular support members such that the tubular support members define a rigid frame. The tent assembly further includes a mechanism for removably securing the frame to a support surface and a canvas removably positional over the frame for preventing undesirable foreign debris from entering beneath the frame. An inflatable mattress is sized and shaped for nesting on the flat bed of the flat bed truck. The tent assembly further includes a mechanism for selectively inflating the mattress such that a user can introduce and displace air from the mattress as needed during periodic use. The inflating mechanism is detachably engagable with the inlet port and includes one implement selected from the group including a manual air-pump and an electrically powered air-pump.

The prior art described above teaches devices such as an air mattress having a removable heating pad, an air mattress having removable portions to accommodate a pregnant woman, an air mattress configured for fitting securely into the flatbed portion of a pickup truck and conform around the wheel well compartments, and an air mattress having a built-in electric pump. However, the prior art fails to teach a multi-purpose air mattress having selectively removable wheel well recess inserts, upper and lower perimeter chambers, and sidewall support seams for increasing and ensuring structural stability and integrity of the air mattress and allowing for its effective use both within a vehicle flatbed and on any other relatively flat surface in otherwise conventional fashion. Aspects of the present invention fulfill these needs and provide further related advantages as described in the following summary.

SUMMARY OF THE INVENTION

Aspects of the present invention teach certain benefits in construction and use which give rise to the exemplary advantages described below.

The present invention solves the above-described problems by providing a multi-purpose air mattress apparatus configured for use with vehicles having beds that define an opposing pair of inwardly protruding wheel well compartments, such as a pickup truck or sport utility vehicle (SUV), or for home or other use on a relatively flat surface in otherwise conventional fashion, as herein described below.

The apparatus comprises, in an exemplary embodiment, an inflatable air mattress having a top surface, a bottom surface, and two opposing sidewalls. Each of the sidewalls define a lateral recess sized for accepting at least a portion of the wheel well compartments therewithin and further define recess ledges that selectively sit atop the wheel well compartments. An upper perimeter chamber is integral along an upper perimeter edge of the air mattress and extends distally therefrom in a relatively horizontal direction, the upper perimeter chamber further defining a perimeter ledge that is in the same plane and integral with the recess ledges and is positioned at least partially over each of the lateral recesses. Additionally, a lower perimeter chamber is positioned within the air mattress along a lower perimeter edge thereof.

In a further embodiment, each of the sidewalls further provide a mid-wall support seam configured for ensuring that the sidewalls maintain a relatively planar shape and resist bulging when a user places his or her weight on the air mattress.

In a still further embodiment, the apparatus provides a pair of removable filler members sized and configured for being selectively positioned within the lateral recesses in order to support the recess ledges when the air mattress is positioned on a relatively flat surface.

Thus, when the apparatus is positioned within the bed of the vehicle and the wheel well compartments are positioned at least partially within the lateral recesses, the recess ledges in combination with the perimeter ledge cover substantially any exposed portions of the wheel well compartments and the perimeter ledge substantially contacts the bed wall even for varying width beds, rendering more of the bed a usable sleep surface. Likewise, when the apparatus is positioned on a relatively flat surface and the filler members are inserted within the lateral recesses, the recess ledges are thereby supported, providing additional support for the apparatus and the user and, again, render a more usable sleep surface, while the upper and lower perimeter chambers and the support seams further maintain a stable structure of the apparatus during either use.

A primary objective inherent in the above described apparatus and method of use is to provide advantages not taught by the prior art.

Another objective is to provide such an apparatus that is configured for use with a vehicle such as a pickup truck or sport utility vehicle (SUV) and includes recesses formed in the air mattress for receiving the wheel well compartments of a vehicle.

A further objective is to provide such an apparatus that has selectively removable wheel well recess inserts for insertion within the recesses for use on any relatively flat surface in otherwise conventional fashion.

A yet further objective is to provide such an apparatus that has built-in components for inflating and deflating the mattress.

A still further objective is to provide such an apparatus that has an attachable or built-in heating pad.

A still further objective is to provide such an apparatus that has upper and lower chambers, as well as sidewall support seams, for increasing and ensuring structural stability and integrity of the air mattress.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

DETAILED DESCRIPTION OF THE INVENTION

The above described drawing figures illustrate aspects of the invention in at least one of its exemplary embodiments, which are further defined in detail in the following description.

Figure 1:
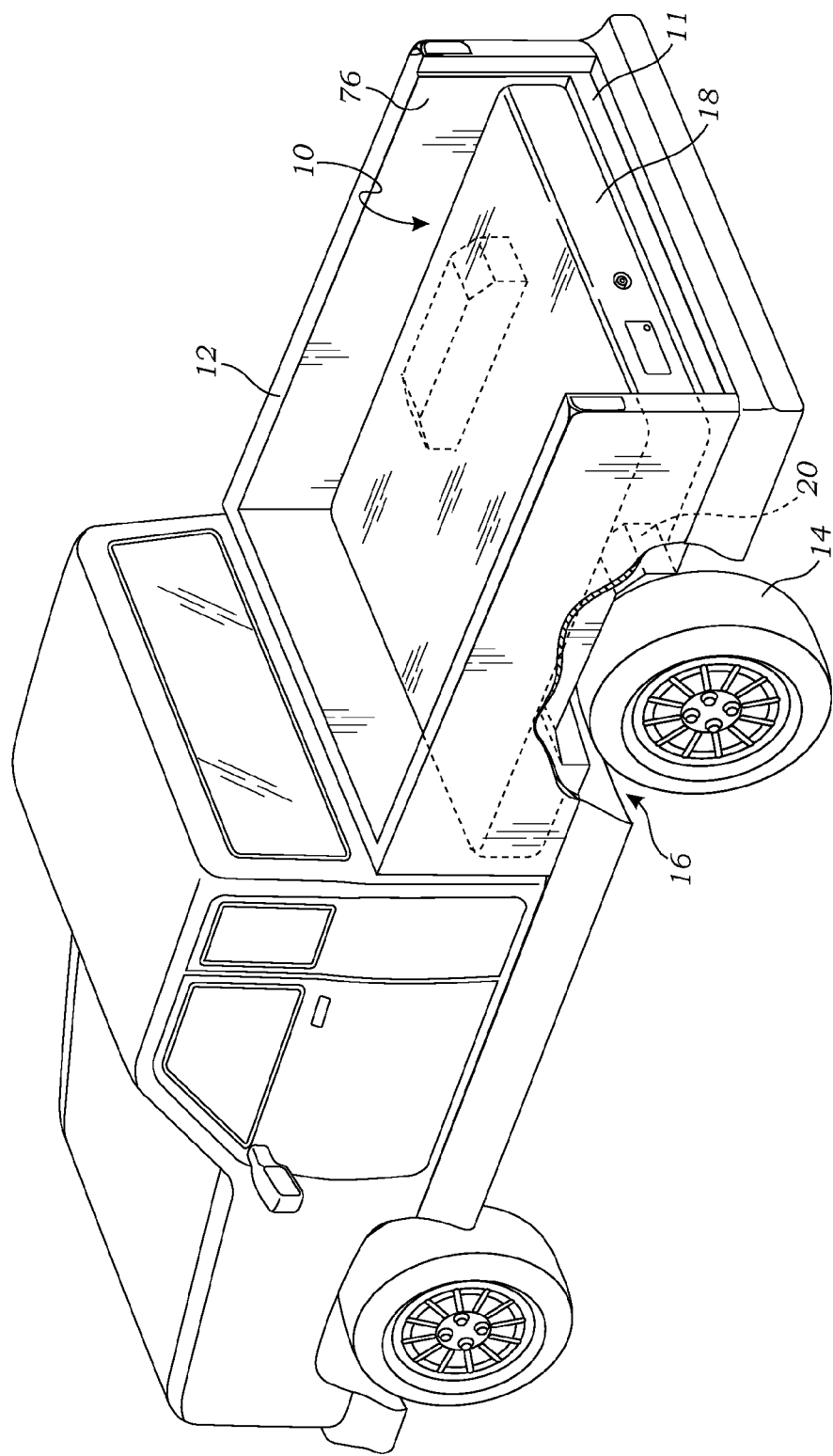
FIG. 1 is a perspective view of an exemplary embodiment of the present invention positioned within a truck bed.

As shown in FIG. 1, the present invention is a multi-purpose air mattress apparatus, designated generally as 10 in the drawings, which is adapted for being removably positioned within a bed 11 of a vehicle such as a truck 12 or for use on any other relatively flat surface in otherwise conventional fashion. It should be noted that while a truck is used herein to describe the various features of the present invention in connection with use in a vehicle, a truck is only one type of vehicle in which the present invention may be used. As such, the present invention should not be so limited.

Figure 2:
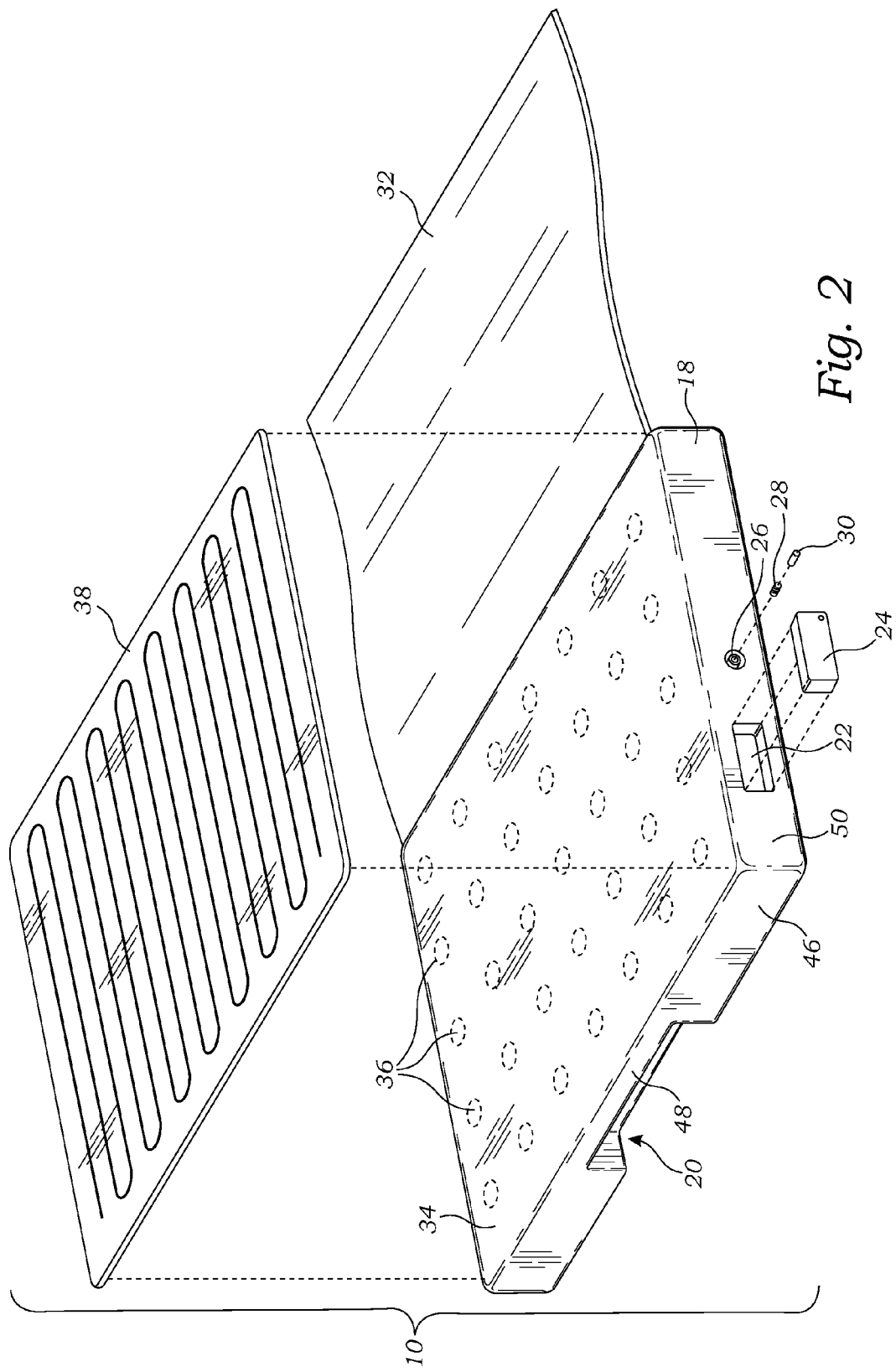
FIG. 2 is a partially exploded perspective view thereof.

The apparatus 10 includes an inflatable air mattress 18 having lateral recesses 20 (only one is shown in FIG. 1, the opposite side of the air mattress 18 being symmetrical). Each one of the recesses 20 receives wheel well compartment 16, which is disposed over wheel 14 of truck 12. The recesses 20 allow the apparatus 10 to fit around and over the wheel wells 16 formed in the bed 11 of truck 12. As shown in FIG. 2, the lateral recesses 20 do not extend completely from top to bottom of the air mattress 18, but define a recess ledge 48 that sits atop the wheel wells 16 so that the entire space between the sidewalls of the bed 11 of the truck 12 is available for sleeping, instead of only the space between the wheel wells 16.

In one embodiment, as shown in FIG. 2, the apparatus 10 includes air mattress 18, a cover 32, and a heating pad 38. When assembled, heating pad 38 is received between a top surface 34 of air mattress 18 and cover 32. As shown, the cover 32 is joined to top surface 34 along at least a first edge. Cover 32 may be releasably sealed to top surface 34 along a second edge, through the use of a zipper, a hook and loop fastening material, such as Velcro, or through the use of any other suitable releasable fastener, allowing heating pad 38 to be easily removed from the air mattress 18 and cover 32. Alternatively, heating pad 38 may be permanently secured to air mattress 18. Heating pad 38 may be thermostatically controlled, or may be selectively adjusted by the user to produce a desired heat output.

Air mattress 18 and cover 32 may be made of conventional vinyl material, nylon or any other suitable pliable durable plastic or other material forming an inflatable bladder, allowing for resilience and comfort when air mattress 18 is inflated. Further, heating pad 38 may be any conventional type of heating pad, such as, but not limited to, a standard 12-volt heating pad provided for home use.

Figure 4:
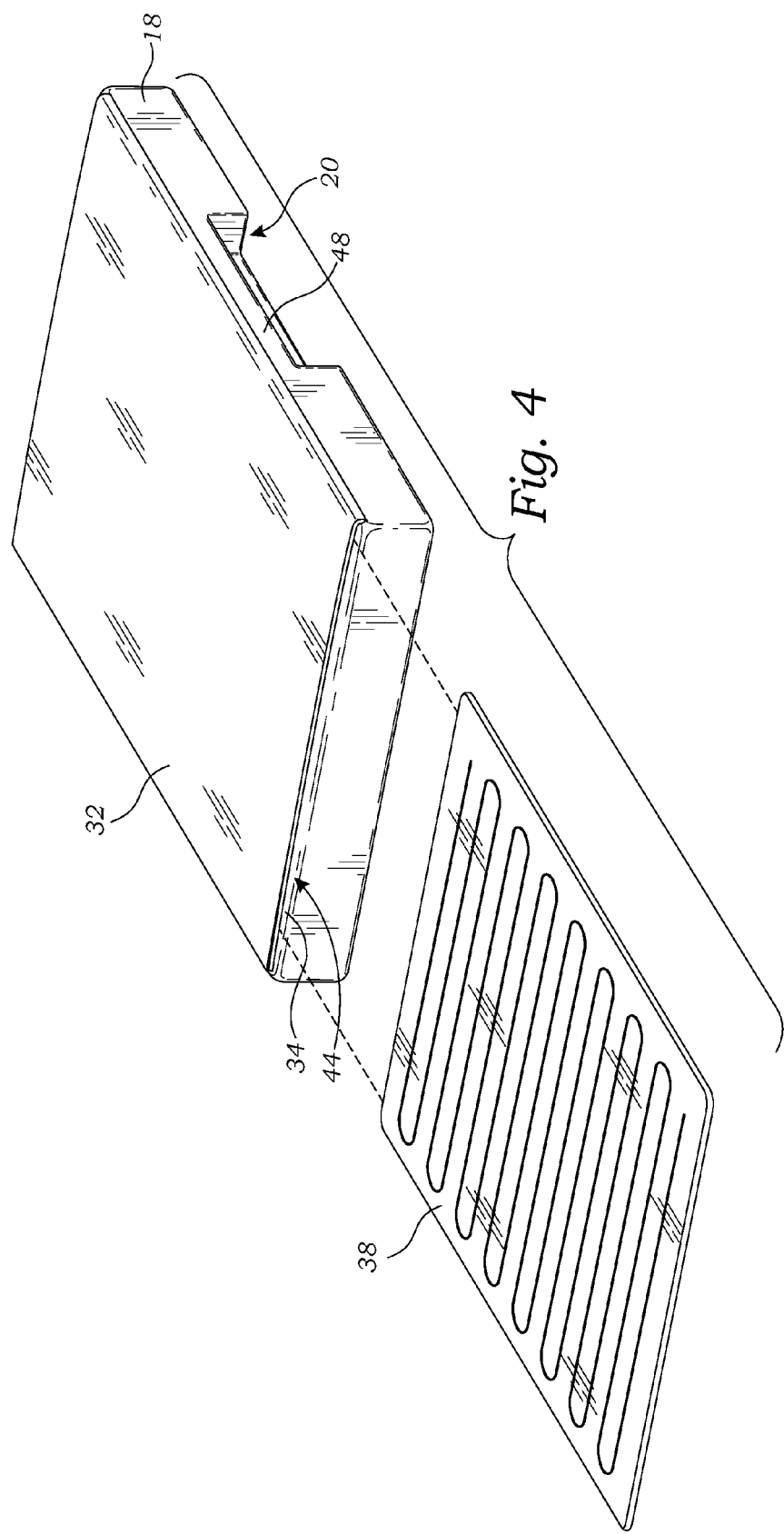
FIG. 4 is a perspective view of the present invention showing a removable heating pad exploded therefrom.

As shown in FIG. 4, cover 32 may be joined to top surface 34 along three edges, thus forming an open pocket 44. Heating pad 38 is removably received within pocket 44, depending on the needs and desires of the user. Alternatively, cover 32 may be sealed to top surface 34 along the entire periphery thereof, in order to permanently hold heating pad 38 between cover 32 and top surface 34. Cover 32 is sealed to top surface 34 through any suitable method, such as, but not limited to, heat sealing.

As further shown in FIG. 2, a cavity 22 is formed in a rear wall 50 of air mattress 18. Though illustrated here as being formed in the rear wall 50, it should be understood that the positioning of cavity 22 is dependent upon the needs and desires of the user, and the purpose for which the air mattress 18 is to be used. The cavity 22 is sized and shaped to receive a portable air pump 24, for inflating air mattress 18. Air pump 24 may be any conventional portable air pump and may be powered by the vehicle's battery, a separate portable battery (as shown in the alternative embodiment of FIG. 5, to be described in further detail below), a standard outdoor 110-volt or 220-volt AC power supply, such as are often found in camping grounds and trailer parks, or by any other suitable power source, including any standard indoor or outdoor AC or DC electrical sources. Similarly, heating pad 38 may be powered by the vehicle's battery, by a separate portable battery or by any other suitable power source. Air pump 24 may be fixed within cavity 22, or may be removable, allowing for separate storage and transport.

An air port 26 is formed in rear wall 50, allowing for the selective passage of air in and out of air mattress 18. An air valve 28 selectively seals port 26 and allows the user to selectively deflate or inflate the air mattress 18. Valve 28 may be a standard Boston-type valve, or any other suitable, user-adjustable fluid valve. A cap 30 is provided for covering valve 28, thus preventing accidental leakage of air through port 26 and valve 28.

Although cavity 22 and port 26 are shown as being formed in rear wall 50 of air mattress 18, it should be understood that cavity 22 and port 26 may be formed in any suitable portion of air mattress 18, depending upon the needs and desires of the user. In the preferred embodiment, cavity 22 and port 26 are formed in rear wall 50 in order to provide easy access thereto when apparatus 10 is received in the bed 11 of a truck 12, such as shown in FIG. 1. Preferably, air pump 24 and valve 28 are positioned adjacent one another, though the positioning of air pump 24 and valve 28 are dependent on the needs of the user. Port 26 may, alternatively, be formed within cavity 22, allowing for direct connection between air pump 24 and valve 28.

Figure 3:
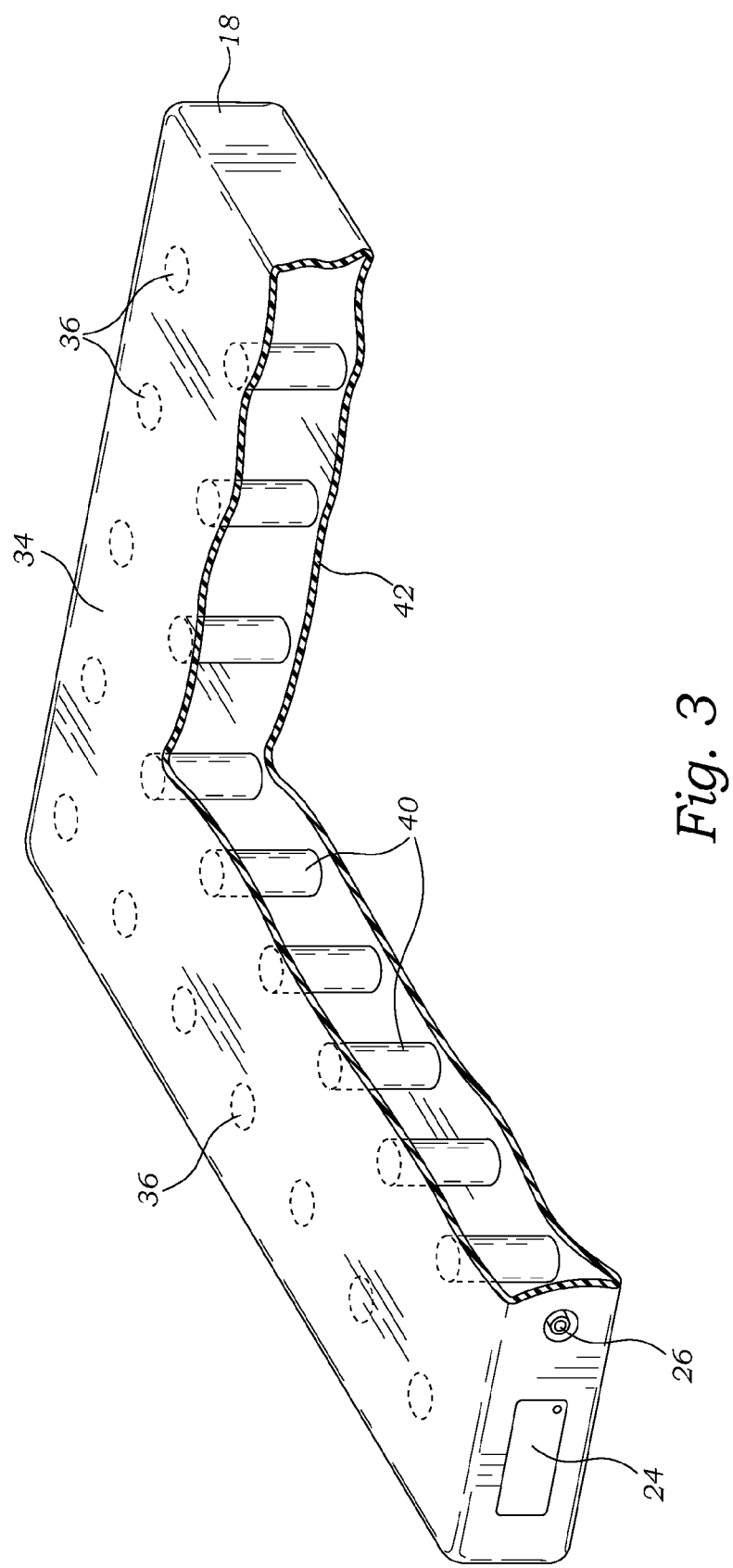
FIG. 3 is a cross-sectional view of a mattress portion of the present invention.

In one embodiment, as shown in the cut-away view of FIG. 3, a plurality of collapsible columns 40 are disposed within air mattress 18. Each collapsible column has an upper end and a lower end, with the upper end of each column 40 being sealed to top surface 34, and the lower end being sealed to a bottom surface 42 of the air mattress 18. The columns 40 provide additional support for the user and may be covered springs, air cylinders, inflatable cylinders, plastic coils or any other suitable deformable supports. Horizontally-oriented surface rings 36 may be formed where the columns 40 are sealed to top surface 34 and bottom surface 42, thus providing a design or pattern in the outer surfaces of air mattress 18. The columns 40 also provide additional stability to the air mattress 18 when the air mattress 18 supports a load, such as the weight of the user.

Figure 8A:
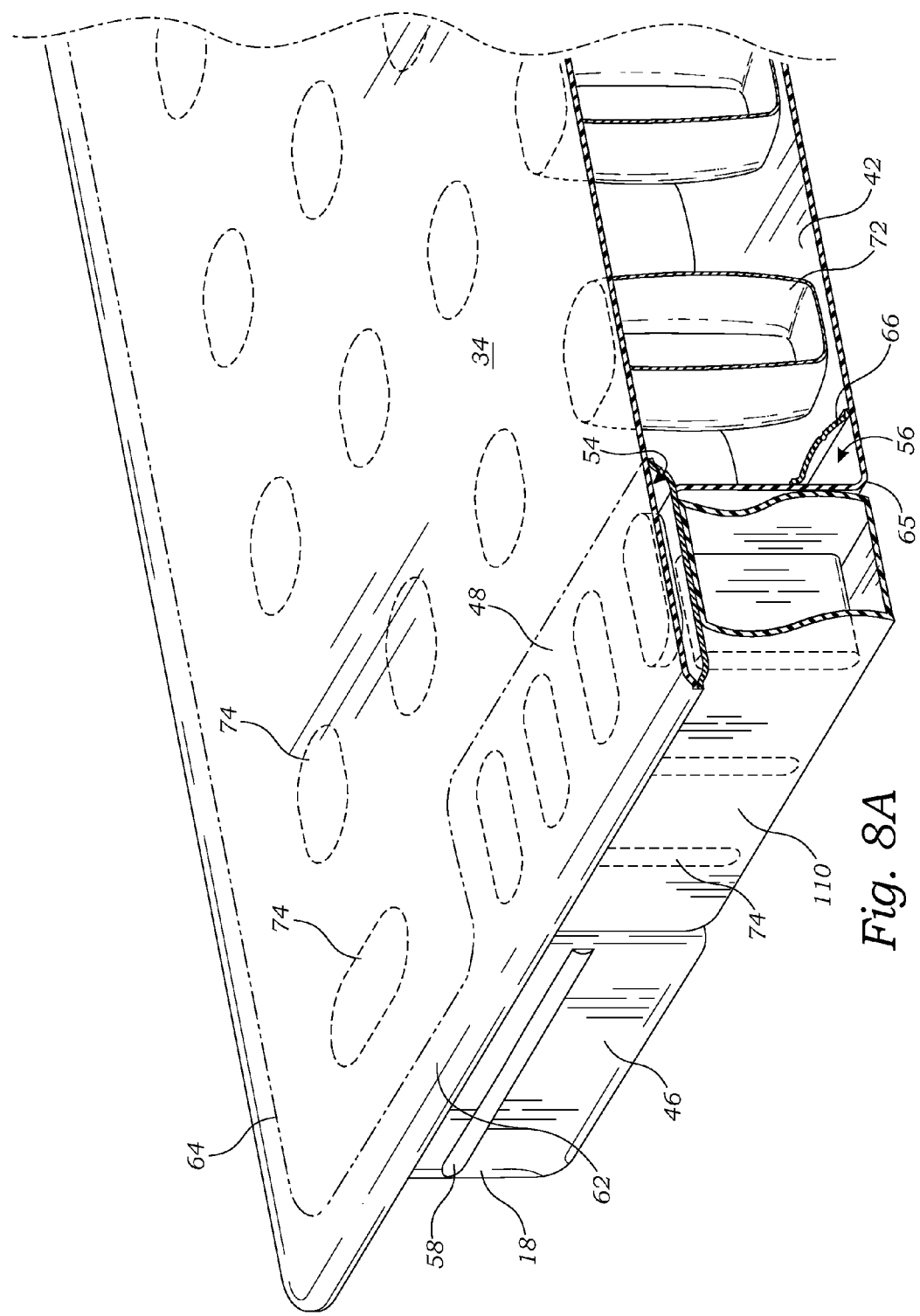
FIGS. 8A and 8B are partial cross-sectional views thereof.
Figure 8B:
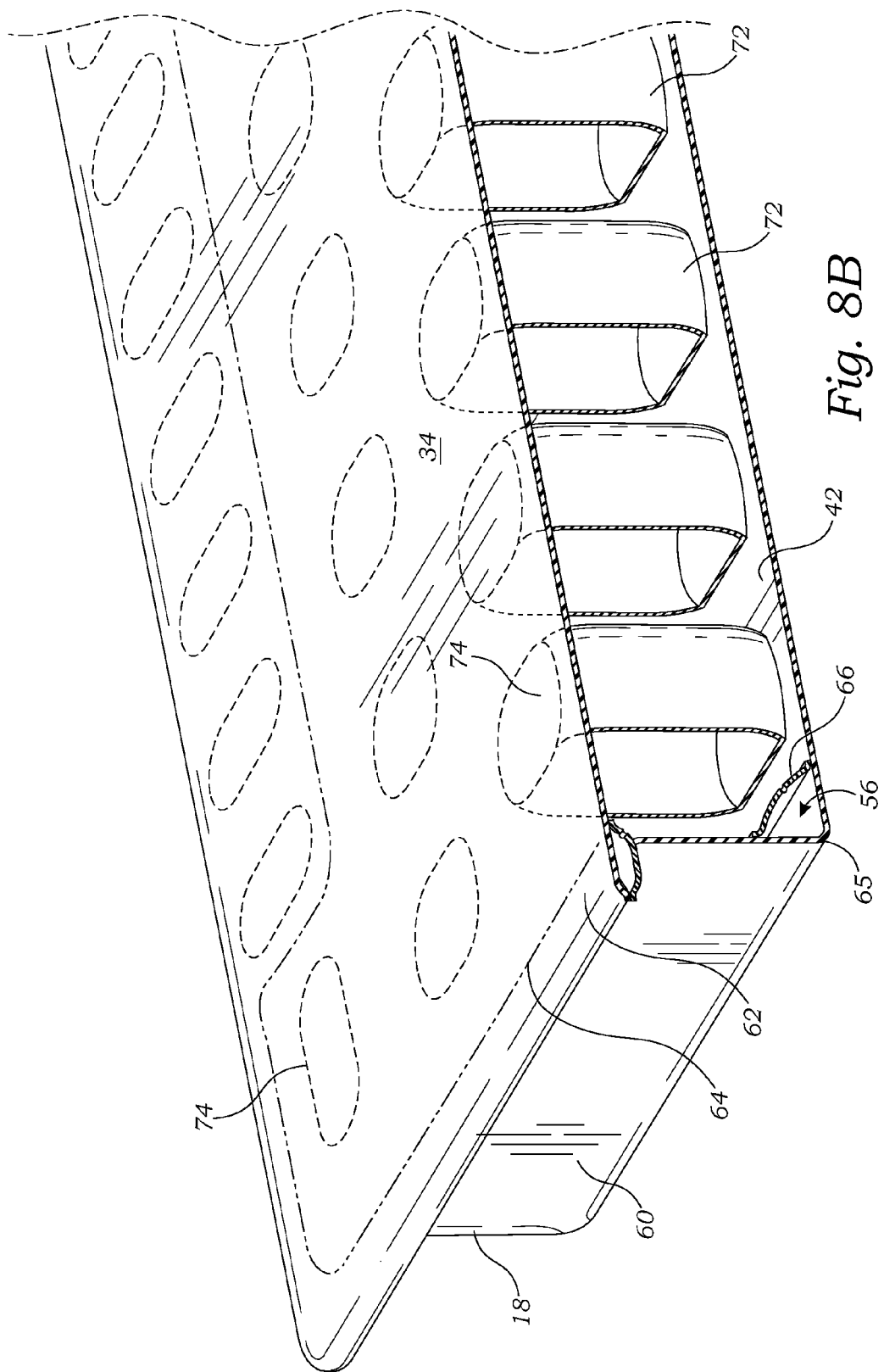

In an alternate embodiment, as shown in the cut-away views of FIGS. 8A and 8B, the collapsible columns 40 are substituted with a plurality of vertically-oriented collapsible interior loops 72, the interior loops 72 configured for restricting the top surface 34 and bottom surface 42 from bulging, and ensuring that the air mattress 18 remains uniformly inflated. The interior loops 72 are preferably constructed of the same resilient material as the air mattress 18. Similar to the collapsible columns 40 described above, horizontally-oriented surface ovals 74 are formed where the interior loops 72 are sealed to top surface 34 and bottom surface 42 of the air mattress 18.

Figure 5:
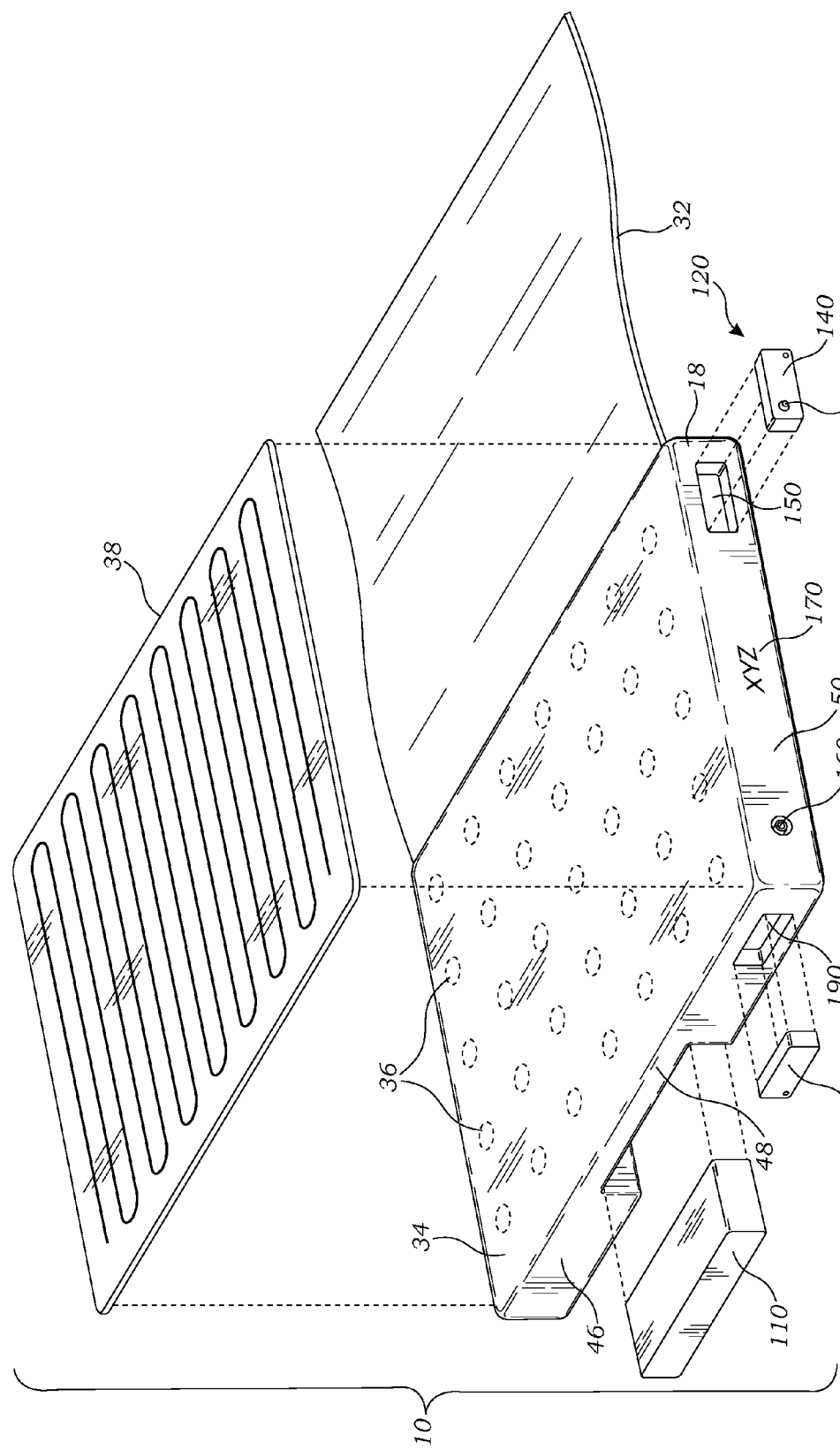
FIG. 5 is an exploded view of an alternate embodiment of the present invention.
Figure 7:
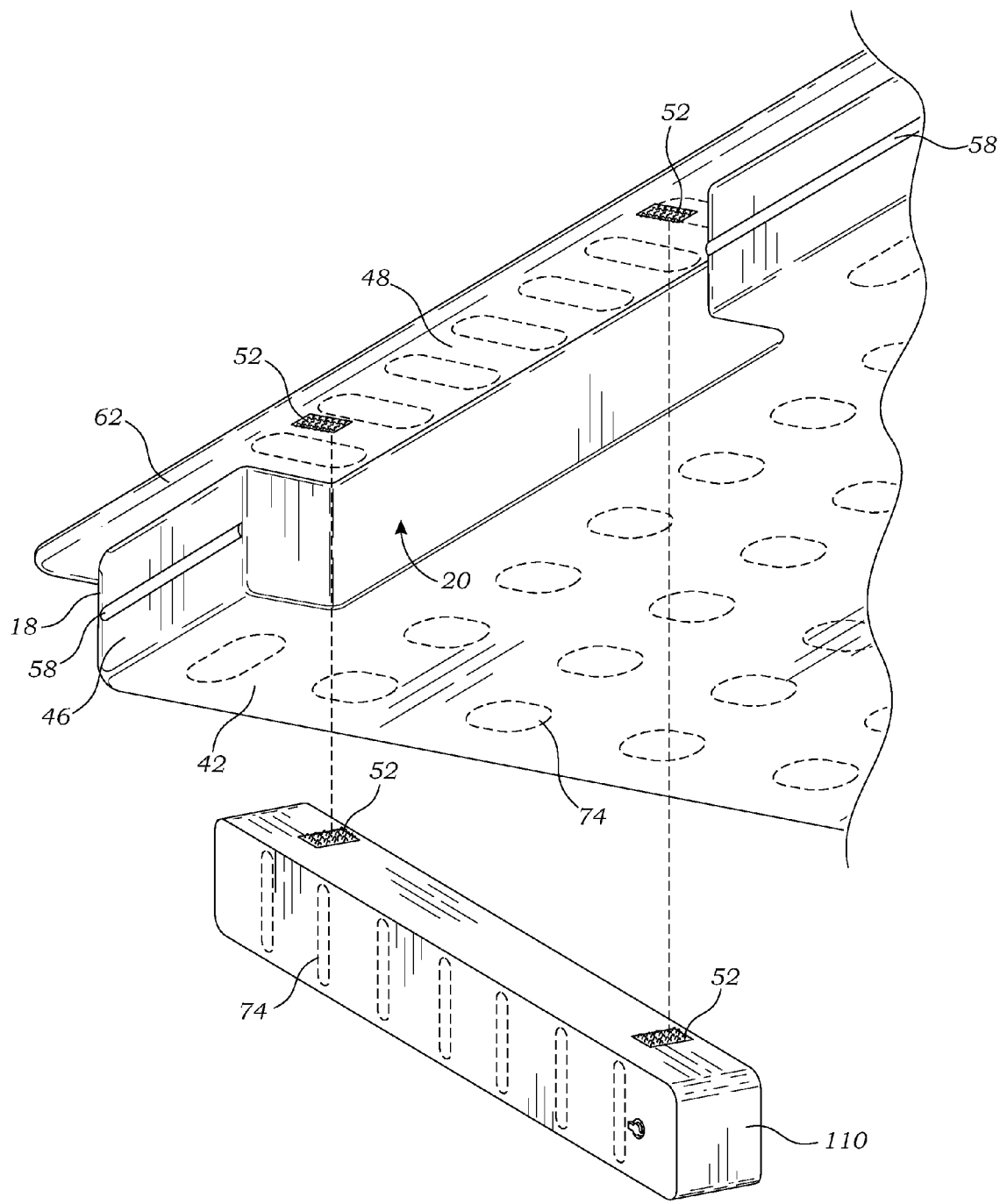
FIG. 7 is a partial perspective view thereof.

In the embodiment of FIG. 5, apparatus 10 includes air mattress 18 having lateral recesses 20, as described above, formed therein, heating pad 38 and releasable cover 32, similar to those shown in the embodiment of FIG. 2. The apparatus 10, however, also includes a pair of filler members 110, selectively and releasably received within each of the recesses 20. As shown best in FIG. 7, filler members 110 are selectively and releasably engageable within the recesses 20 preferably through the use of a releasable fastener 52, such as a hook and loop fastening material or any other suitable releasable fastening material now known or later developed. Thus, if the user chooses to use the apparatus 10 in an environment other than in the flatbed of a vehicle, such as on the ground or on a floor, the filler members 110 can be used to fill recesses 20, providing additional support for the user and air mattress 18. In one embodiment, filler members 110 are separately inflatable through a filler air port 112, in a similar manner to air mattress 18. Similar to the air mattress 18, each of the filler members 110 preferably provides a plurality of collapsible interior loops 72, best shown in FIG. 8A, positioned and configured for ensuring that the filler members 110 remain uniformly inflated and do not bulge. In another embodiment, filler members 110 are non-inflatable structures.

In addition, in the embodiment of FIG. 5, a cavity 150 is formed in rear wall 50 for receiving an air pump module 120. The air pump module 120 includes an air pump 140, similar to the air pump 24 of the embodiment of FIG. 2, but further includes an attached air valve 130. A secondary manual air valve 160 is further provided in rear wall 50, allowing for connection to a second source of pressurized air.

Further, user-selectable indicia 170 may be imprinted on the exterior of air mattress 18, as shown. The apparatus 10 also includes a cavity 190 formed in a sidewall 46 of the mattress 18, which receives a removable and replaceable battery pack 180. Battery pack 180 provides optional additional power to heating pad 38 and may further be used for powering air pump 140 of module 120.

The apparatus 10 may be sized and contoured for reception in any suitable vehicle, with recesses 20 specifically being shaped to receive a particular type of wheel well compartment 16. Alternatively, as shown in FIG. 5, the apparatus 10 may be used with any suitable support surface, such as a floor or on a box spring, rather than being placed in a vehicle. Recesses 20 may be contoured to receive any formation provided in a support surface, may be filled with filler members 110, or in some embodiments may be removed altogether for the air mattress 18 to be used on the floor or ground. Filler members 110 may be manufactured together with the air mattress 18 in order to size and shape filler members 110 to match recesses 20, providing a mattress that appears to be a conventional mattress to the observer. Similarly, the separate elements 24, 120 and 180 may all be manufactured together with the air mattress 18 in order to ensure matching between the separate components and the respective recesses 22, 150, and 190.

Figure 6:
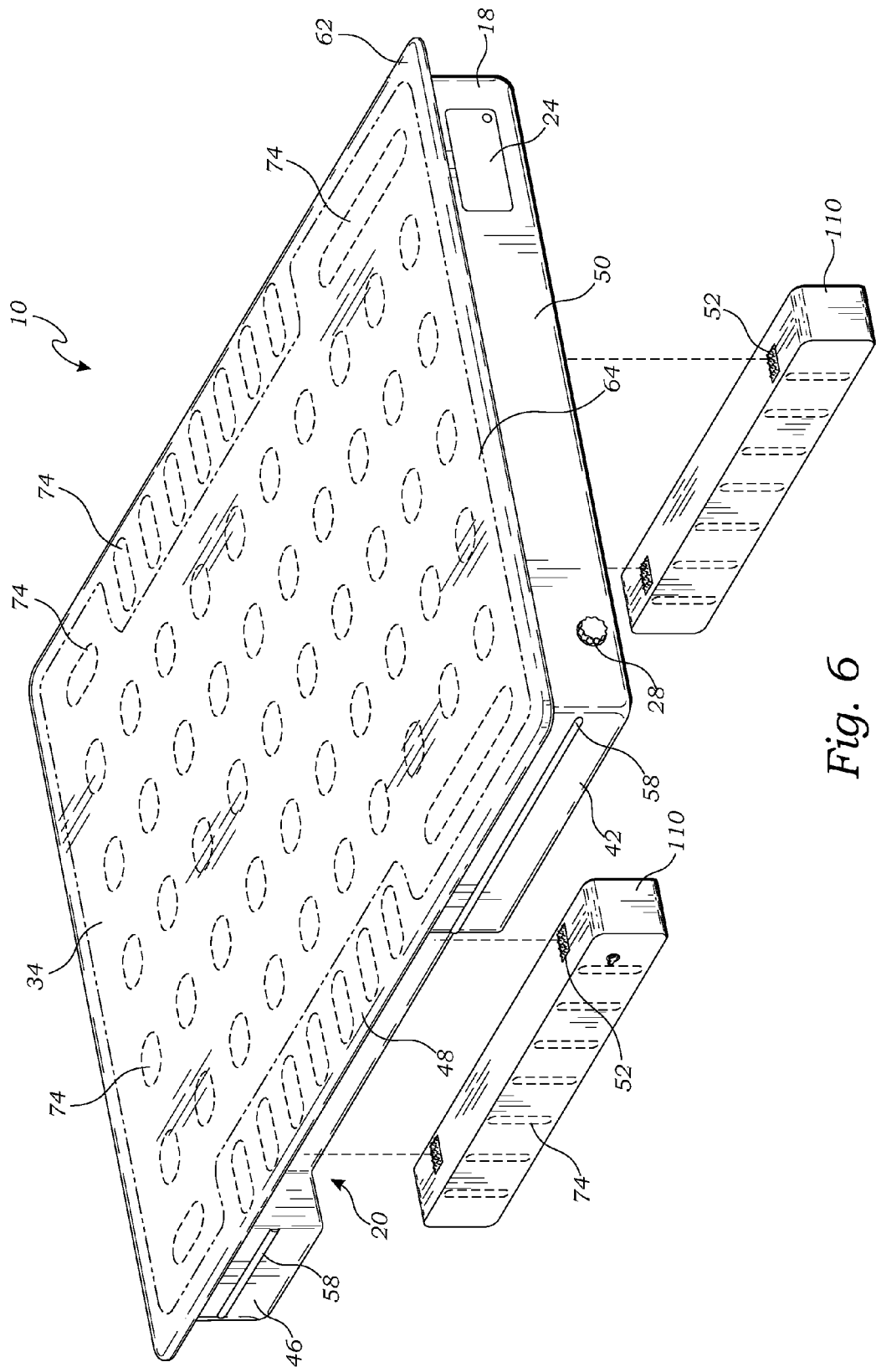
FIG. 6 is a perspective view of a further embodiment of the present invention.

In the further alternative embodiment of the apparatus 10 shown in FIG. 6, the air mattress 18 provides an upper perimeter chamber 54 and a lower perimeter chamber 56. As best shown in FIGS. 8A and 8B, the upper perimeter chamber 54 is integral with an upper perimeter edge 64 of the air mattress 18 and extends distally in a relatively horizontal direction, forming a perimeter ledge 62 that is in the same plane and integral with the recess ledges 48. The lower perimeter chamber 56 is positioned within the air mattress 18 along a lower perimeter edge 65 of the air mattress, and is formed by a relatively diagonally oriented chamber wall 66 in abutting engagement between the bottom surface 42 and the corresponding front, rear, or sidewall 60, 50, 46 of the air mattress 18. Both the upper and lower perimeter chambers 54 and 56 are preferably constructed of the same resilient material as the air mattress 18. Additionally, the upper and lower perimeter chambers 54 and 56 each provide at least one airflow aperture (not shown) which interconnect, and allow fluid communication between, the perimeter chambers 54 and 56 and the air mattress 18; thus, the perimeter chambers 54 and 56 are inflated and/or deflated with the air mattress 18.

The upper and lower perimeter chambers 54 and 56 are configured to increase and ensure lateral structural stability when the air mattress 18 is being used. Thus, when a user places his or her weight on the air mattress 18, the upper and lower perimeter chambers 54 and 56 maintain the shape and structural integrity of the air mattress 18, thereby reducing any lateral shifting of the air mattress 18, which in turn creates a more stable surface for the user to sit or lay on. Additionally, the upper and lower perimeter chambers 54 and 56 assist in creating a structural frame as the air mattress 18 is inflated or deflated.

Figure 9:
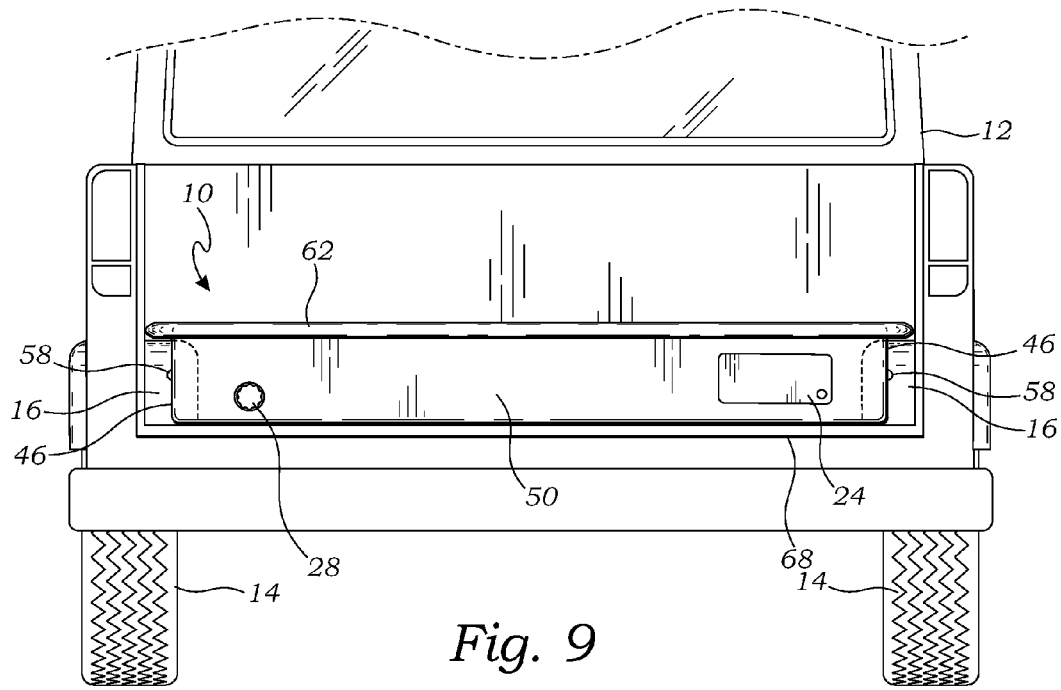
FIGS. 9 and 10 are rear elevational views of the present invention positioned within a wide truck bed and a narrow truck bed respectively.
Figure 10:
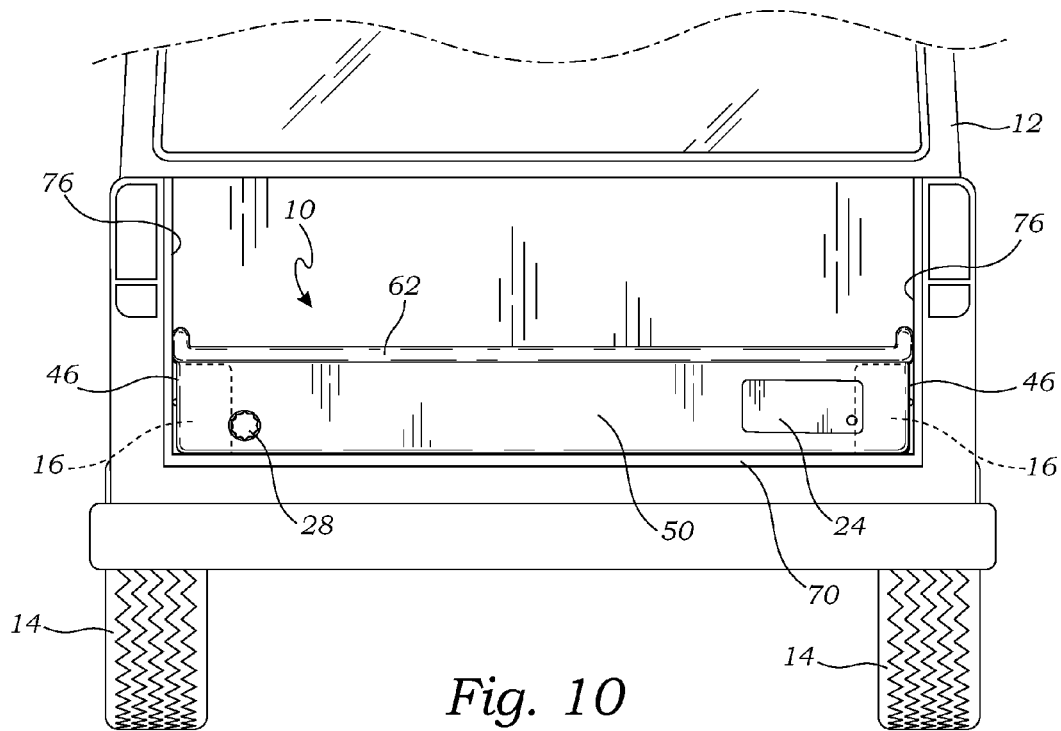

As shown in FIGS. 9 and 10, the upper perimeter chamber 54 and the resulting perimeter ledge 62, in conjunction with the recesses 20, enable the present invention to be used in a wide range of truck beds, as well as other types of vehicle beds, such as SUVs. FIG. 9 is a rear elevational view of the apparatus 10 positioned within a relatively wide bed 68 of a truck 12. With the apparatus 10 centered in the wide bed 68, the wheel well compartments 16 extend only partially into the recesses 20, leaving a portion of the wheel well compartments 16 uncovered by the recess ledges 48. However, because the perimeter ledge 62 extends horizontally from the upper perimeter edge 64 of the air mattress 18, the perimeter ledge 62 covers the exposed portion of the wheel well compartments 16; thus, the apparatus 10 is capable of covering most, if not all, of the wide bed 68. As shown in FIG. 10, the same apparatus 10 is capable of fitting within a relatively narrow bed 70 of a truck 12 as well. As illustrated, with the apparatus 10 centered in the narrow bed 70, the wheel well compartments extend completely into the recesses 20, thereby forcing the perimeter ledge 62 into a substantially vertical orientation so as to be squeezed up against a bed wall 76 of the narrow bed 70, with essentially a net fit between the sidewall 46 of the air mattress 18 and the bed wall 76. Thus, the perimeter ledge 62 allows the present invention to fit a wide range of vehicle bed dimensions.

As best shown in FIG. 6, the air mattress 18 also preferably has a horizontally oriented mid-wall support seam 58 integral with the sidewalls 46 of the air mattress 18. The support seam 58 is configured to ensure that the sidewalls 46 maintain a relatively planar shape and resist bulging when a user places his or her weight on the air mattress 18. In a further embodiment, the support seam 58 is also integral with the rear wall 50 and front wall 60 of the air mattress 18 to further prevent bulging.

It should also be noted that the various features of each of the above-described embodiments may be combined in any logical manner and are intended to be included within the scope of the present invention.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An inflatable mattress placeable within a bed of a vehicle having wheel well compartments, the mattress comprising:
    a substantially planar lower portion configured to lie on top of a substantially horizontal surface of the bed, the lower portion incorporating a first lateral recess and a second lateral recess, the first lateral recess and second lateral recess configured to accept opposing wheel well compartments of the vehicle, respectively;
    a substantially planar upper portion configured to lie substantially horizontally within the bed of the vehicle and substantially over the lower portion, the upper portion defining ledges over the wheel well compartments and further defining an upper perimeter chamber formed along an upper perimeter edge thereof;
    a plurality of collapsible columns located between an upper surface and a lower surface of the mattress and configured to provide loading support to the mattress; and
    a cavity configured to accept an electric air pump formed on a rear wall of the mattress.

2. The inflatable mattress of claim 1, further comprising a port configured to accept an air valve.

3. The inflatable mattress of claim 2, wherein the port is formed on the rear wall of the mattress.

4. The inflatable mattress of claim 2, wherein the port is formed on a surface of the mattress.

5. The inflatable mattress of claim 2, wherein the air valve is disposed in the port.

6. The inflatable mattress of claim 2, wherein a user-adjustable fluid valve is disposed in the port.

7. The inflatable mattress of claim 1, further comprising an electric air pump disposed in the cavity.

8. The inflatable mattress of claim 7, further comprising a rechargeable battery disposed in the cavity and coupled to operate the electric air pump.

9. The inflatable mattress of claim 1, further comprising a plurality of filler members configured to fit within the first and second lateral recesses.

10. An inflatable mattress placeable within a bed of a vehicle having wheel well compartments, the mattress comprising:
    a substantially planar, I-shaped lower portion configured to lie on top of a substantially horizontal surface of the bed, the lower portion incorporating a first lateral recess and a second lateral recess, the first lateral recess and second lateral recess configured to accept opposing wheel well compartments of the vehicle, respectively;
    a substantially planar, rectangular-shaped upper portion configured to lie substantially horizontally within the bed of the vehicle and substantially over the lower portion, the upper portion defining ledges over the wheel well compartments and further defining an upper perimeter chamber formed along an upper perimeter edge thereof;
    a plurality of substantially cylindrical collapsible columns configured to provide loading support to the mattress;
    a cavity configured to snugly accept an electric air pump substantially flush with a first wall of the mattress;
    an electric air pump substantially within the cavity; and
    a plurality of inflatable filler members configured to fit within the first lateral recess and the second lateral recess,
    wherein the collapsible columns have upper ends and lower ends, the upper ends being sealed to an upper surface of the mattress, and the lower ends being sealed to a lower surface of the mattress, and
    wherein the upper portion and the lower portion comprise a unitary structure.

11. The inflatable mattress of claim 10, further comprising:
    a port configured to accept an air valve; and
    an air valve substantially within the port.

12. The inflatable mattress of claim 11, wherein the cavity is formed on a rear wall of the mattress, and wherein the port and the air valve are disposed on the rear wall of the mattress set apart from the cavity.

13. The inflatable mattress of claim 10 wherein the electric pump receives power from a DC power supply.

14. The inflatable mattress of claim 13, wherein the DC power supply is a rechargeable DC battery integrated with the pump.

15. An inflatable mattress placeable within a bed of a vehicle having wheel well compartments, the mattress comprising:
    a substantially planar lower portion configured to conformingly lie on top of a substantially horizontal surface of the bed, the lower portion having means for accepting opposing wheel well compartments of the vehicle, respectively;
    a substantially horizontal mid-wall support seam formed in at least one side wall of the lower portion;
    a substantially planar upper portion configured to lie substantially horizontally within a mediate portion of the bed of the vehicle and substantially over the lower portion, the upper portion defining ledges over the wheel well compartments and further defining an upper perimeter chamber formed along an upper perimeter edge thereof;
    means for supporting loading on the mattress;
    means for accepting an electric air pump; and
    means for accepting an air valve.

16. The inflatable mattress of claim 15, wherein the means for accepting the electric air pump includes a cavity and the means for accepting an air valve includes a port, and the cavity and port are formed on a rear wall of the mattress.

17. The inflatable mattress of claim 16, further comprising:
    the electric air pump disposed in the means for accepting an electric air pump, wherein the electric air pump is powered by a rechargeable power supply.

18. The inflatable mattress of claim 17, wherein air flow through the electric air pump is bidirectional.

19. The inflatable mattress of claim 15, wherein:
    the means for accepting opposing wheel well compartments comprises a first lateral recess and a second lateral recess; and
    a filler member is configured to be placed within each of the first lateral recess and the second lateral recess.

20. The inflatable mattress of claim 16, wherein the port further comprises an air valve disposed within the port.

21. The inflatable mattress of claim 15, wherein the means for supporting loading on the mattress comprises a plurality of collapsible columns having upper ends and lower ends, the upper ends being sealed to an upper surface of the mattress, and the lower ends being sealed to a lower surface of the mattress.

22. The inflatable mattress of claim 15, wherein the means for supporting loading on the mattress comprises a plurality of vertically-oriented collapsible interior loops located between an upper surface and a lower surface of the mattress.

23. An inflatable mattress placeable within a bed of a vehicle having wheel well compartments, the mattress comprising:
    a substantially planar lower portion configured to conformingly lie on top of a substantially horizontal surface of the bed, the lower portion having means for accepting opposing wheel well compartments of the vehicle, respectively;

a substantially planar upper portion configured to lie substantially horizontally within a mediate portion of the bed of the vehicle and substantially over the lower portion, the upper portion defining ledges over the wheel well compartments and further defining an upper perimeter chamber formed along an upper perimeter edge thereof;

means for supporting and stabilizing loading having deformable supports disposed between the substantially upper planar portion and the substantially planar lower portion, and disposed to maintain substantially planar the respective upper portion relative to the lower portion;

a cavity having an electric air pump fitted thereinto; and an air valve coupled to a portion of the means for supporting and stabilizing loading.

24. The inflatable mattress of claim 23, further comprising a plurality of filler members capable of filling the means for accepting opposing wheel well compartments.

* * * * *